United States Patent
Luo et al.

(10) Patent No.: US 11,671,363 B2
(45) Date of Patent: Jun. 6, 2023

(54) METHOD AND APPARATUS FOR CROSS-SERVICE-ZONE COMMUNICATION, AND DATA CENTER NETWORK

(71) Applicant: Huawei Technologies Co., Ltd., Shenzhen (CN)

(72) Inventors: Yinwei Luo, Shenzhen (CN); Yapeng Wu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 827 days.

(21) Appl. No.: 14/732,270

(22) Filed: Jun. 5, 2015

(65) Prior Publication Data

US 2015/0281078 A1    Oct. 1, 2015

Related U.S. Application Data

(63) Continuation of application No. PCT/CN2012/086048, filed on Dec. 6, 2012.

(51) Int. Cl.
*H04L 45/745* (2022.01)
*H04L 67/563* (2022.01)
(Continued)

(52) U.S. Cl.
CPC .......... *H04L 45/745* (2013.01); *H04L 41/042* (2013.01); *H04L 67/10* (2013.01); *H04L 67/563* (2022.05)

(58) Field of Classification Search
CPC ..... H04L 47/745; H04L 41/042; H04L 67/10; H04L 67/2814
(Continued)

(56) References Cited

U.S. PATENT DOCUMENTS 6,922,724 B1 * 7/2005 Freeman ................ G06F 9/505
  709/223
8,032,638 B2 * 10/2011 Xie ........................ H04L 29/06
  370/392

(Continued)

FOREIGN PATENT DOCUMENTS

CN        101394333 A      3/2009
CN        101534263 A      9/2009
(Continued)

OTHER PUBLICATIONS

Wang, Guohui, and TS Eugene Ng. "The impact of virtualization on network performance of amazon ec2 data center." In Infocom, 2010 proceedings IEEE, pp. 1-9. IEEE, 2010.*

(Continued)

*Primary Examiner* — Suraj M Joshi
(74) *Attorney, Agent, or Firm* — Conley Rose, P.C.

(57) ABSTRACT

A method and an apparatus for cross-service-zone communication, and a data center network. When a first virtual machine in a server sends a packet to a second virtual machine, the server determines, through searching, whether a routing table of a tenant to which the first virtual machine belongs exists on the server; when the routing table of the tenant to which the first virtual machine belongs does not exist on the server, send the packet to a gateway; receive the routing table of the tenant to which the first virtual machine belongs sent by the gateway through a service zone manager; and forward a subsequent packet of the first virtual machine according to the routing table; where the first virtual machine and the second virtual machine are located in different service zones.

20 Claims, 6 Drawing Sheets

(51) Int. Cl.
*H04L 41/042* (2022.01)
*H04L 67/10* (2022.01)

(58) Field of Classification Search
USPC .......................................... 709/201–203, 217
See application file for complete search history.

(56) References Cited

U.S. PATENT DOCUMENTS

| | | | | |
|---|---|---|---|---|
| 8,054,832 | B1* | 11/2011 | Shukla | H04L 45/00 370/230 |
| 8,213,336 | B2* | 7/2012 | Smith | H04L 45/586 370/254 |
| 8,261,264 | B2 | 9/2012 | Winter et al. | |
| 2001/0028641 | A1* | 10/2001 | Becher | H04W 8/12 370/352 |
| 2004/0194102 | A1* | 9/2004 | Neerdaels | H04L 29/06 718/100 |
| 2006/0182130 | A1* | 8/2006 | Even | H04L 12/1822 370/401 |
| 2007/0115990 | A1* | 5/2007 | Asati | H04L 45/00 370/392 |
| 2008/0219206 | A1* | 9/2008 | Agarwal | H04B 7/18528 370/316 |
| 2009/0034418 | A1* | 2/2009 | Flammer, III | H04W 40/248 370/238 |
| 2009/0257439 | A1* | 10/2009 | Xu | H04L 45/02 370/401 |
| 2009/0304003 | A1* | 12/2009 | Huynh Van | H04L 12/4633 370/395.31 |
| 2010/0107162 | A1* | 4/2010 | Edwards | H04L 45/58 718/1 |
| 2011/0103259 | A1* | 5/2011 | Aybay | H04L 45/306 370/254 |
| 2011/0214124 | A1* | 9/2011 | Ferris | G06F 8/63 718/1 |
| 2013/0019277 | A1* | 1/2013 | Chang | H04L 63/0218 726/1 |
| 2014/0244718 | A1* | 8/2014 | Das | G06F 11/1425 709/203 |
| 2018/0173557 | A1* | 6/2018 | Nakil | H04L 41/0631 |

FOREIGN PATENT DOCUMENTS

| | | | | |
|---|---|---|---|---|
| CN | 101771632 | A | 7/2010 | |
| CN | 102055667 | A | 5/2011 | |
| CN | 102137001 | A | 7/2011 | |
| CN | 102447618 | A | 5/2012 | |
| CN | 102457439 | A | 5/2012 | |
| WO | WO1998059467 | A2 * | 6/1998 | ............ H04L 29/12 |
| WO | WO-9859467 | A2 * | 12/1998 | ........ H04L 12/4641 |
| WO | 2009036678 | A1 | 3/2009 | |

OTHER PUBLICATIONS

Foreign Communication From A Counterpart Application, Chinese Application No. 201280002181.0, Chinese Office Action dated Mar. 4, 2016, 6 pages.

Foreign Communication From A Counterpart Application, Chinese Application No. 201280002181.0, Chinese Search Report dated Feb. 23, 2016, 2 pages.

McKeown, et al. "OpenFlow: Enabling Innovation in Campus Networks", ACM SIGCOMM Computer Communication Review. vol. 38, No. 2, Apr. 2008, pp. 69-74.

Foreign Communication From A Counterpart Application, European Application No. 12889584.4, European Office Action dated Sep. 8, 2016, 8 pages.

Hendrick, C., L., "Introduction to the Internet Protocols," XP002137143, Internet Citation, Retrieved from the Internet: URL: ftp://rtfm.mit.edu/pub/net/internet.text [retrieved on May 8, 2000], Oct. 3, 1988, 28 pages.

Mahalingam, M., et al., "VXLAN: A Framework for Overlaying Virtualized Layer 2 Networks over Layer 3 Networks," draft-mahalingam-dutt-dcops-vxlan-02.txt, Aug. 22, 2012, 22 pages.

Foreign Communication From A Counterpart Application, European Application No. 12889584.4, Extended European Search Report dated Sep. 30, 2015, 9 pages.

Partial English Translation and Abstract of Chinese Patent Application No. CN101534263A, Jun. 10, 2015, 7 pages.

Foreign Communication From A Counterpart Application, PCT Application No. PCT/CN2012/086048, English Translation of International Search Report dated Sep. 19, 2013, 3 pages.

Foreign Communication From A Counterpart Application, PCT Application No. PCT/CN2012/086048, English Translation of Written Opinion dated Sep. 19, 2013, 16 pages.

* cited by examiner

METHOD AND APPARATUS FOR CROSS-SERVICE-ZONE COMMUNICATION, AND DATA CENTER NETWORK

CROSS-REFERENCE TO RELATED APPLICATION

This application is a continuation of International Application No. PCT/CN2012/086048, filed on Dec. 6, 2012, which is hereby incorporated by reference in its entirety.

TECHNICAL FIELD

The present invention relates to the field of communications technologies, and in particular, to a method and an apparatus for cross-service-zone communication, and a data center network.

BACKGROUND

At present, a cloud management function only manages a limited number of servers, and a data center provider needs to deploy different cloud management functions due to reasons of an operating expense, security, business, and so on. Therefore, a large data center requires deployment of cloud management functions in different zones. Each cloud management function manages a certain number of physical resources such as calculation resources, storage resources, and network resources. The zone managed by each cloud management function is referred to as one service zone. Different service zones possibly use a same or different network virtualization and overlay networking technologies.

When resources of one tenant are deployed in different service zones, a cloud management function needs to guarantee to provide correct resources and policies across service zones. Also, it needs to be guaranteed that cross-service-zone communication can be performed between tenant terminal systems of the tenant.

As shown in FIG. 1, FIG. 1 is a schematic diagram of a scenario of cross-service-zone communication in the prior art. The data center network shown in FIG. 1 is divided into two service zones, namely, a first service zone and a second service zone. The cloud management function A manages the first service zone and resources of the first service zone, and the cloud management function B manages the second service zone and resources the second service zone. One virtual switch (V-Switch) and at least one virtual machine (VM) are virtualized in each server (not shown in the figure). The VM communicates with another VM through the V-switch. The gateway acquires configuration information from the cloud management function A and the cloud management function B and generates routing tables of the first service zone and the second service zone. The data center network has two tenants a and b. VMa1 to VMa4 are virtual machines for tenant a, while VMb1 to VMb4 are virtual machines for tenant b.

It can be seen from FIG. 1 that one virtual machine can only communicate with another virtual machine belonging to the same tenant. When one virtual machine (for example, VMb1 or VMa3) communicates with another virtual machine (for example, VMb2 or VMa4) located in the same service zone, a packet sent by the virtual machine first reaches a virtual switch of the virtual machine, the virtual switch corresponding to the virtual machine sends the packet to a virtual switch corresponding to the target virtual machine, and the virtual switch corresponding to the target virtual machine forwards the packet to the target virtual machine. When one virtual machine (for example, VMa2 or VMb2) communicates with another virtual machine (for example, VMb3 or VMa3) located in a different service zone, a packet sent by the virtual machine first reaches a virtual switch of the virtual machine, the virtual switch of the virtual machine then sends the packet to a gateway, the gateway queries a forwarding table and sends the packet to a virtual switch of a target virtual machine, and the virtual switch of the target virtual machine forwards the packet to the target virtual machine. When one virtual switch (for example, VMb2) needs to communicate with another apparatus across the Internet, a packet sent by the virtual switch is sent to a gateway through a virtual switch of the virtual switch, and the gateway forwards the packet.

The prior art has at least the following disadvantages: the traffic of cross-service-zone communication passes the gateway, and the gateway is prone to become a bottleneck of communication, resulting in traffic congestion. Also, when a large number of tenants needs to perform cross-service-zone communication, forwarding table entries of the gateway also increase in number, which lowers the forwarding performance of the gateway and further lowers the forwarding efficiency of the system. In addition, all cross-service-zone traffic passes through the gateway, and the gateway is prone to become a target of hacker attacks, bringing great potential safety hazards to network communication.

SUMMARY

The present invention provides a method and an apparatus for cross-service-zone communication, and a data center network, so as to solve problems of traffic congestion and low system forwarding performance caused by cross-service-zone communication through a gateway.

In a first aspect of the present invention, a method for cross-service-zone communication is provided and includes: receiving a routing table of a tenant, to which a first virtual machine belongs, sent by a gateway, where the first virtual machine is located in a first service zone; determining a server to receive the routing table; and determining a registration state of the server, and when the server is a registered server, sending the routing table to the server, so that the server forwards, according to the routing table, a packet that is sent to a second virtual machine by the first virtual machine, where the second virtual machine is located in a second service zone.

According to a first implementation manner of the first aspect, before the receiving a routing table of a tenant, to which a first virtual machine belongs, sent by a gateway, the method further includes receiving configuration information of the first virtual machine sent by a cloud management function, and sending a request message to the gateway according to the configuration information, where the request message is used for requesting the routing table.

With reference to the first aspect or the first implementation manner of the first aspect, in a second implementation manner of the first aspect, the method further includes receiving a registration message sent by the server, registering the server according to the registration message, and recording registration information of the server, and the determining a registration state of the server includes determining the registration state of the server according to the registration information of the server.

With reference to the second implementation manner of the first aspect, in a third implementation manner, the method further includes receiving a deregistration message sent by the server, and deleting the registration information of the server according to the deregistration message.

With reference to the foregoing implementation manners of the first aspect, the method further includes receiving an updated routing table of the tenant sent by the gateway, and sending the updated routing table to the server.

In a second aspect of the present invention, another method for cross-service-zone communication is provided and includes: when a first virtual machine on a server needs to send a packet to a second virtual machine, determining, through searching, whether a routing table of a tenant to which the first virtual machine belongs exists on the server; when the routing table of the tenant to which the first virtual machine belongs does not exist on the server, sending the packet to a gateway; receiving the routing table of the tenant to which the first virtual machine belongs sent by the gateway through a service zone manager; and forwarding a subsequent packet of the first virtual machine according to the routing table; where the first virtual machine and the second virtual machine are located in different service zones.

According to a first implementation manner of the second aspect, the method further includes receiving configuration information of a virtual machine sent by a cloud management function, and generating the first virtual machine according to the configuration information.

According to a second implementation manner of the second aspect, the method further includes receiving information of the service zone manager sent by a cloud management function, and sending a registration message to the service zone manager, so that the service zone manager records registration information of the server.

With reference to the second implementation manner of the second aspect, in a third implementation manner of the second aspect, the method further includes receiving a notification message sent by the cloud management function, and sending a deregistration message to the service zone manager according to the notification message, so that the service zone manager deletes the registration information of the server.

With reference to the foregoing implementation manners of the second aspect, the method further includes, when the routing table of the tenant to which the first virtual machine belongs is updated in the gateway, receiving the updated routing table of the tenant that is sent by the gateway through the service zone manager; and forwarding a subsequent packet of the first virtual machine according to the updated routing table.

In a third aspect of the present invention, an apparatus for cross-service-zone communication is provided and includes: a first receiving unit configured to receive a routing table of a tenant, to which a first virtual machine belongs, sent by a gateway, where the first virtual machine is located in a first service zone; a first determination unit configured to determine a server to receive the routing table; a second determination unit configured to determine a registration state of the server; and a first sending unit configured to, when the second determination unit determines that the server is already registered, send the routing table to the server, so that the server forwards, according to the routing table, a packet that is sent to a second virtual machine by the first virtual machine, where the second virtual machine is located in a second service zone.

According to a first implementation manner of the third aspect, the apparatus further includes a second receiving unit configured to receive configuration information of the first virtual machine sent by a cloud management function; and a second sending unit configured to send a request message to the gateway according to the configuration information, where the request message is used for requesting a routing table of a tenant to which the first virtual machine belongs; where the first receiving unit is specifically configured to receive the routing table sent by the gateway according to the request message.

With reference to the third aspect or the first implementation manner of the third aspect, in a second implementation, the apparatus further includes a registration unit configured to receive a registration message sent by the server, register the server, and record registration information of the server; and a storage unit configured to store the registration information; where the second determination unit is specifically configured to determine the registration state of the server according to the registration information.

With reference to the second implementation manner of the third aspect, in a third implementation manner, the apparatus further includes a deregistration unit configured to receive a deregistration message sent by the server, and delete the registration information of the server in the storage unit according to the deregistration message.

With reference to the foregoing implementation manners of the third aspect, the first receiving unit is further configured to receive an updated routing table of the tenant sent by the gateway; and the first sending unit is further configured to send the updated routing table of the tenant to the server.

In a fourth aspect of the present invention, another apparatus for cross-service-zone communication is provided and includes a virtual switch configured to: when a first virtual machine on a server needs to send a packet to a second virtual machine, determine, through searching, whether a routing table of a tenant to which the first virtual machine belongs exists on the server; and when the routing table of the tenant to which the first virtual machine belongs does not exist on the server, send the packet to a gateway; and a service zone agent configured to receive the routing table of the tenant to which the first virtual machine belongs sent by the gateway through a service zone manager, and send the routing table to the virtual switch; where the virtual switch is further configured to forward a subsequent packet of the first virtual machine according to the routing table; and the first virtual machine and the second virtual machine are located in different service zones.

According to a first implementation manner of the fourth aspect, the virtual switch is located in a network virtualization system, and the network virtualization system is further configured to receive configuration information of the first virtual machine sent by a cloud management function, and generate the first virtual machine according to the configuration information.

According to a second implementation manner of the fourth aspect, the virtual switch is located in a network virtualization system, and the network virtualization system is further configured to receive information of the service zone manager sent by a cloud management function, and the service zone agent is further configured to send a registration message to the service zone manager, so that the service zone manager records registration information of the server.

With reference to the second implementation manner of the fourth aspect, in a third implementation manner, the network virtualization system is further configured to receive a notification message sent by the cloud management function, and the service zone agent is further configured to send a deregistration message to the service zone manager according to the notification message, so that the service zone manager deletes the registration information of the server.

With reference to the foregoing implementation manners of the fourth aspect, when the routing table of the tenant to which the first virtual machine belongs is updated in the gateway, the service zone agent is further configured to receive the updated routing table of the tenant that is sent by the gateway through the service zone manager, and send the updated routing table to the virtual switch, and the virtual switch is further configured to forward a subsequent packet of the first virtual machine according to the updated routing table.

In a fifth aspect of the present invention, a data center network is provided and includes a cloud management function, a gateway, and a service zone manager; where the cloud management function is configured to manage a service zone, add a server to the service zone, send information of the service zone manager to the server, create a virtual machine in the server, and send configuration information of the virtual machine to the gateway and the server; the gateway is configured to generate a routing table of a tenant to which the virtual machine belongs according to the configuration information of the virtual machine, and send the routing table to the service zone manager; the service zone manager includes the apparatus in the third aspect; and the server includes the apparatus in the fourth aspect.

In the foregoing embodiments of the present invention, a routing table generated on a gateway is sent to a server, the server can directly forward, according to information of the routing table, a packet sent by a virtual machine on the server, with no need to send the packet to the gateway, which solves problems of traffic congestion and low system forwarding performance caused by cross-service-zone communication through a gateway in the prior art.

BRIEF DESCRIPTION OF DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. The embodiments in the following description are merely a part rather than all of the embodiments of the present invention. All other embodiments obtained by a person of ordinary skill in the art based on the embodiments of the present invention without creative efforts shall fall within the protection scope of the present invention.

Figure 1:
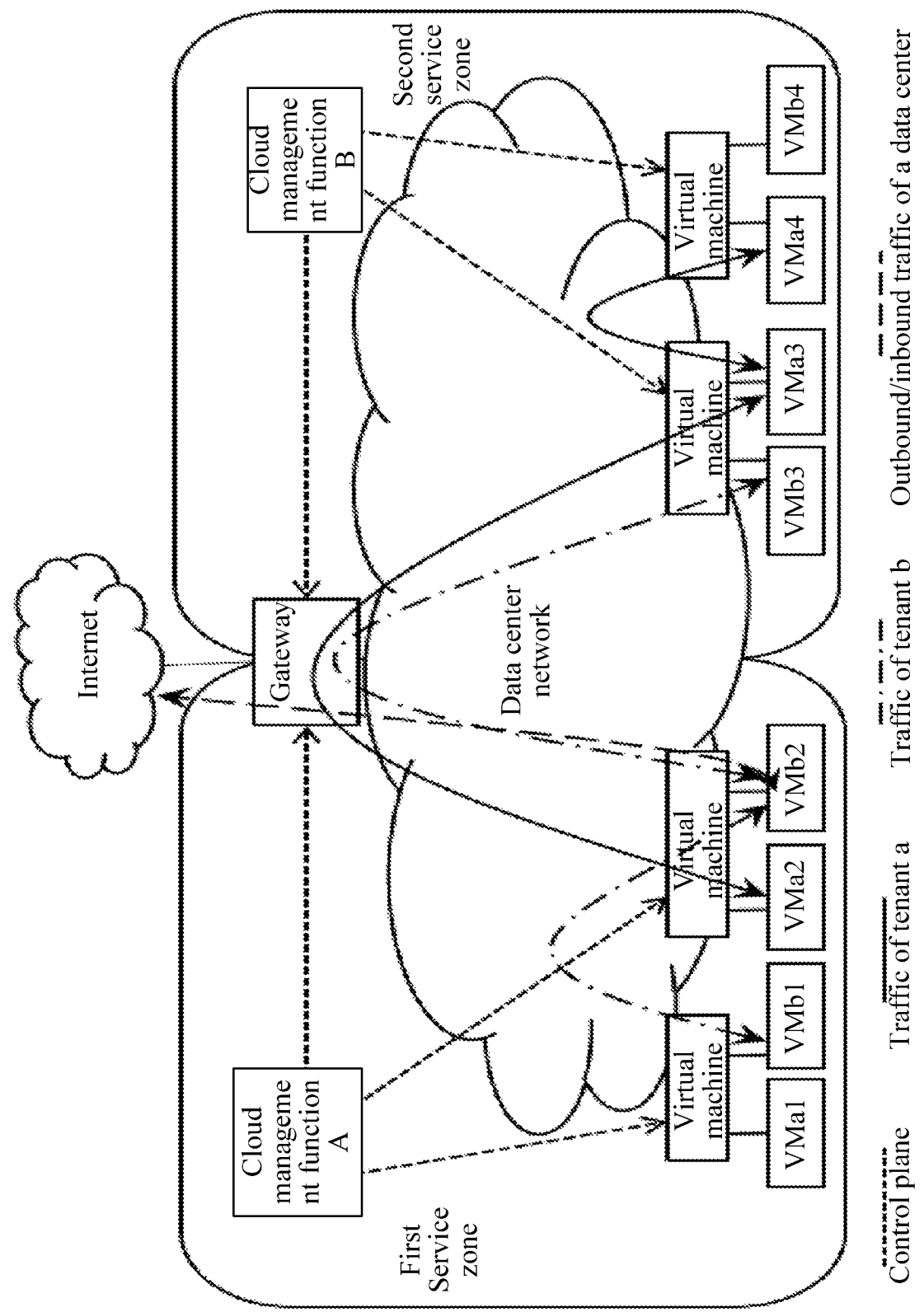
FIG. 1 is a schematic diagram of a scenario of cross-service-zone communication in the prior art.
Figure 2:
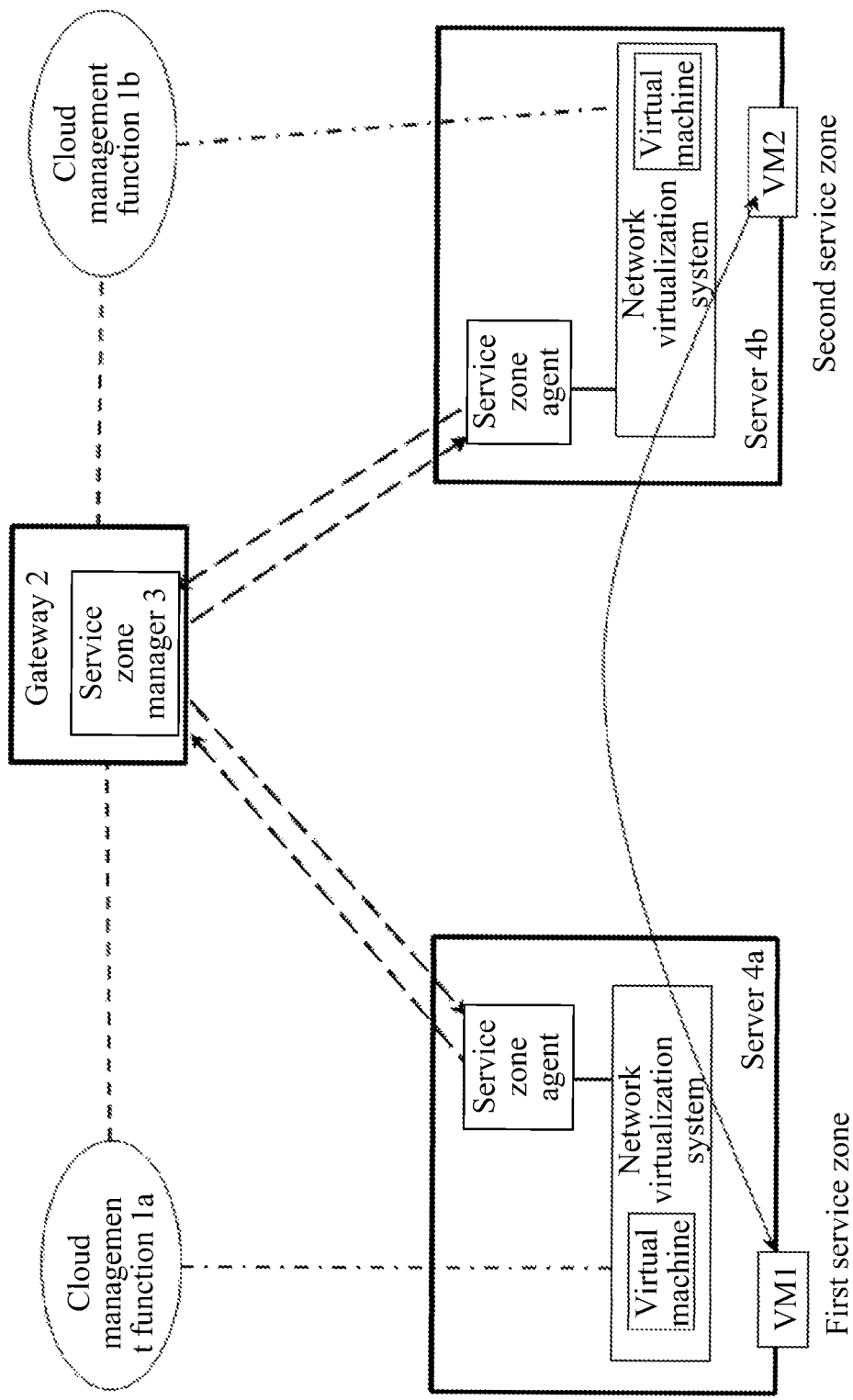
FIG. 2 is a data center network provided in an embodiment of the present invention.

As shown in FIG. 2, a data center network is provided in an embodiment of the present invention. The data center network includes cloud management functions 1a and 1b (generally referred to as 1). Each cloud management function manages one service zone. For example, the cloud management function 1a manages a first service zone, and the cloud management function 1b manages a second service zone. Each service zone includes certain resources, for example, a server 4a or 4b (generally referred to as 4). As shown in FIG. 2, the server 4a is located in the first service zone, and the server 4b is located in the second service zone.

The data center further includes a gateway 2 and a service zone manager 3. The service zone manager 3 may be disposed on the gateway 2 and may also be disposed independently of the gateway 2. The gateway 2 is connected to the cloud management function 1, and is configured to acquire configuration information of a virtual machine from the cloud management function 1, generate a routing table of a tenant to which the virtual machine belongs according to the configuration information, and send the routing table to the service zone manager 3. In another scenario, the gateway receives an Address Resolution Protocol (ARP) packet sent by the server 4 according to the configuration information of the virtual machine, and generates a routing table of a tenant to which the virtual machine belongs according to the ARP packet. The gateway is further configured to forward a packet of the virtual machine according to the routing table. In addition, the gateway 2 is further configured to, when the routing table of the tenant to which the virtual machine belongs is updated, send the updated routing table to the service zone manager 3. The gateway 2 includes a router or switch capable of implementing the foregoing functions.

The cloud management function 1 is further configured to add the server 4 in a service zone managed by the cloud management function 1 and send information of the service zone manager 3 to the server 4. The information of the service zone manager 3 may include an address of the service zone manager 3, and the address includes an Internet Protocol (IP) address or a domain name of the service zone manager 3.

The server 4 is configured to, after receiving address information of the service zone manager 3, register with the service zone manager 3, that is, send a registration message to the service zone manager 3. The service zone manager 3 is configured to receive the registration message sent by the server, register the server 4, and record registration information of the server 4. The registration information of the server 4 includes an address of the server 4 and a registration state of the server 4. The address includes either an IP address or a media access control (MAC) address or both. The registration state is used for recording whether the server has registered with the service zone manager. The registration information of the server 4 may further include information of routing table delivery, that is, whether a routing table is delivered to the server 4, a routing table of which tenant is delivered, the time that a routing table is delivered, and the like.

There may be one or more service zone managers 3. When more than one service zone manager exists, the gateway 2 may send the routing table to any service zone manager, and the server 4 may send a registration message to any service zone manager. The registration information and routing table are synchronized between the plurality of service zone managers.

When the server 4 receives a notification message sent by the cloud management function and it is learned that the server 4 is to be deleted by the cloud management function, the server 4 is further configured to send a deregistration message to the service zone manager 3, and the deregistration message is used to request the service zone manager 3 to delete the registration information of the server 4.

The cloud management function 1 is further configured to create a virtual machine in the server 4 managed by the cloud management function 1, and send the configuration information of the virtual machine to the gateway 2, the service zone manager 3, and the server 4. The configuration information of the virtual machine includes an address of the virtual machine and a subnet identifier of the virtual machine. The address may be either an IP address or a MAC address or both. The configuration information may further include one or more of the following information: a virtual switch (referred to as a virtual machine gateway) corresponding to the virtual machine, an identifier of a virtual machine, and a server where the virtual machine is located. The subnet is a subnet allocated to the tenant to which the virtual machine belongs, and corresponds to the tenant. Therefore, the subnet identifier may be used to represent a tenant.

When the service zone manager 3 is disposed in the gateway 2, the cloud management function (1a or 1b) may only further send the configuration information of the virtual machine to the gateway 2 and the server, and then the gateway 2 sends the configuration information of the virtual machine to the service zone manager 3. The service zone manager 3 acquires a routing table of a tenant to which the virtual machine belongs from the gateway 2 according to the configuration information of the virtual machine and the registration information of the server, and sends the routing table of the tenant to which the virtual machine belongs to the server 4. Specifically, the service zone manager 3 sends the routing table of the tenant to the server according to the configuration information of the virtual machine or according to the information of the server sent by the gateway 2 and the registration information of the server.

The server 4 is further configured to send, according to the routing table, to a target virtual machine, a packet generated by a virtual machine of the tenant that is located in the server. The virtual machine sending the packet and the target virtual machine belong to one same tenant but are located in different service zones. For example, the server 4a sends, according to a routing table of the tenant A received from the service zone manager 3, a packet generated by a VM1 of the tenant A to a VM2 of the tenant A.

Figure 3:
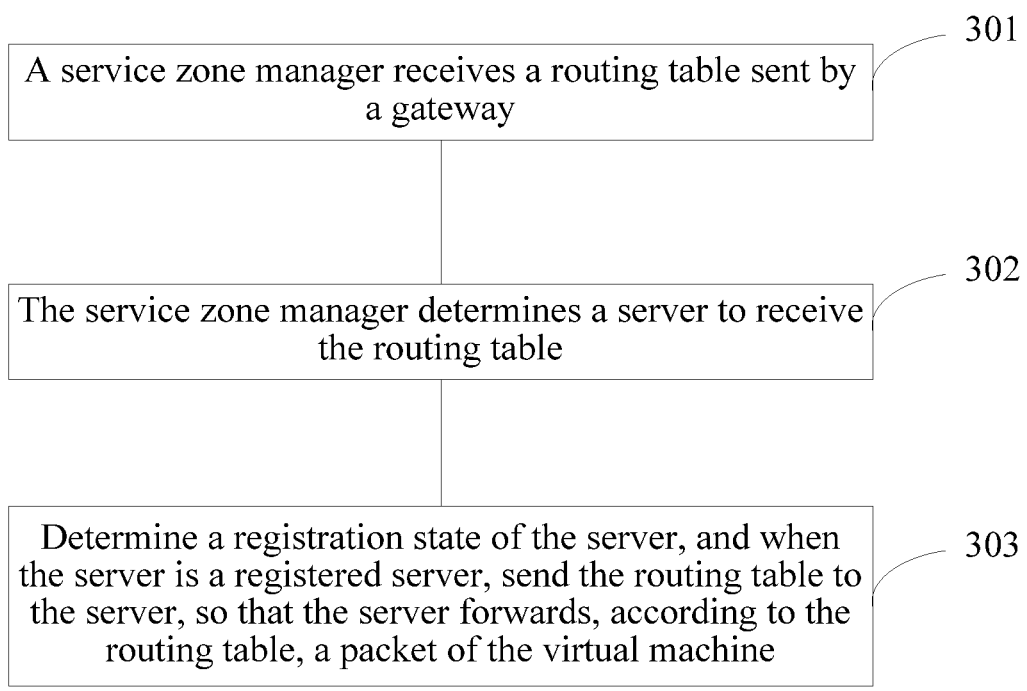
FIG. 3 is a flow chart of a method for cross-service-zone communication provided in an embodiment of the present invention.

On a basis of the data center network shown in FIG. 2, an embodiment of the present invention provides a method for cross-service-zone communication. The method is executed by the service zone manager in FIG. 2, and as shown in FIG. 3, the method includes:

301. A service zone manager receives a routing table of a tenant, to which a first virtual machine belongs, sent by a gateway. The first virtual machine is located in a first service zone.

In one scenario, when receiving a packet sent by a virtual machine for the first time, the gateway determines, according to configuration information of the virtual machine received from a cloud management function, a tenant to which the virtual machine belongs, and sends a routing table of the tenant to which the virtual machine belongs to the service zone manager. The service zone manager receives the routing table sent by the gateway.

In another scenario, after receiving configuration information of a virtual machine sent by a cloud management function, the service zone manager sends a request message to the gateway, where the request message is used for requesting a routing table of a tenant to which the virtual machine belongs, and receives the routing table sent by the gateway. In this scenario, before this step, the method further includes the step of receiving configuration information of the virtual machine sent by the cloud management function.

302. The service zone manager determines a server to receive the routing table.

In one scenario, the service zone manager determines a server to receive the routing table according to information of a server sent by the gateway.

In another scenario, the service zone manager determines a server to receive the routing table according to configuration information of a virtual machine sent by a cloud management function. In this scenario, the server is a server in the configuration information of the virtual machine.

303. Determine a registration state of the server, and when the server is a registered server, send the routing table to the server, so that the server forwards, according to the routing table, a packet that is sent to a second virtual machine by the first virtual machine. The second virtual machine is located in a second service zone.

In this embodiment, the method may further include receiving, by the service zone manager, a registration message sent by the server, registering the server, and recording registration information of the server.

In another implementation manner, the service zone manager further receives an updated routing table of the tenant sent by the gateway, and sends the updated routing table of the tenant to the server.

In another implementation manner, the service zone manager further receives a deregistration message sent by the server, and deletes the registration information of the server according to the deregistration message.

Figure 4:
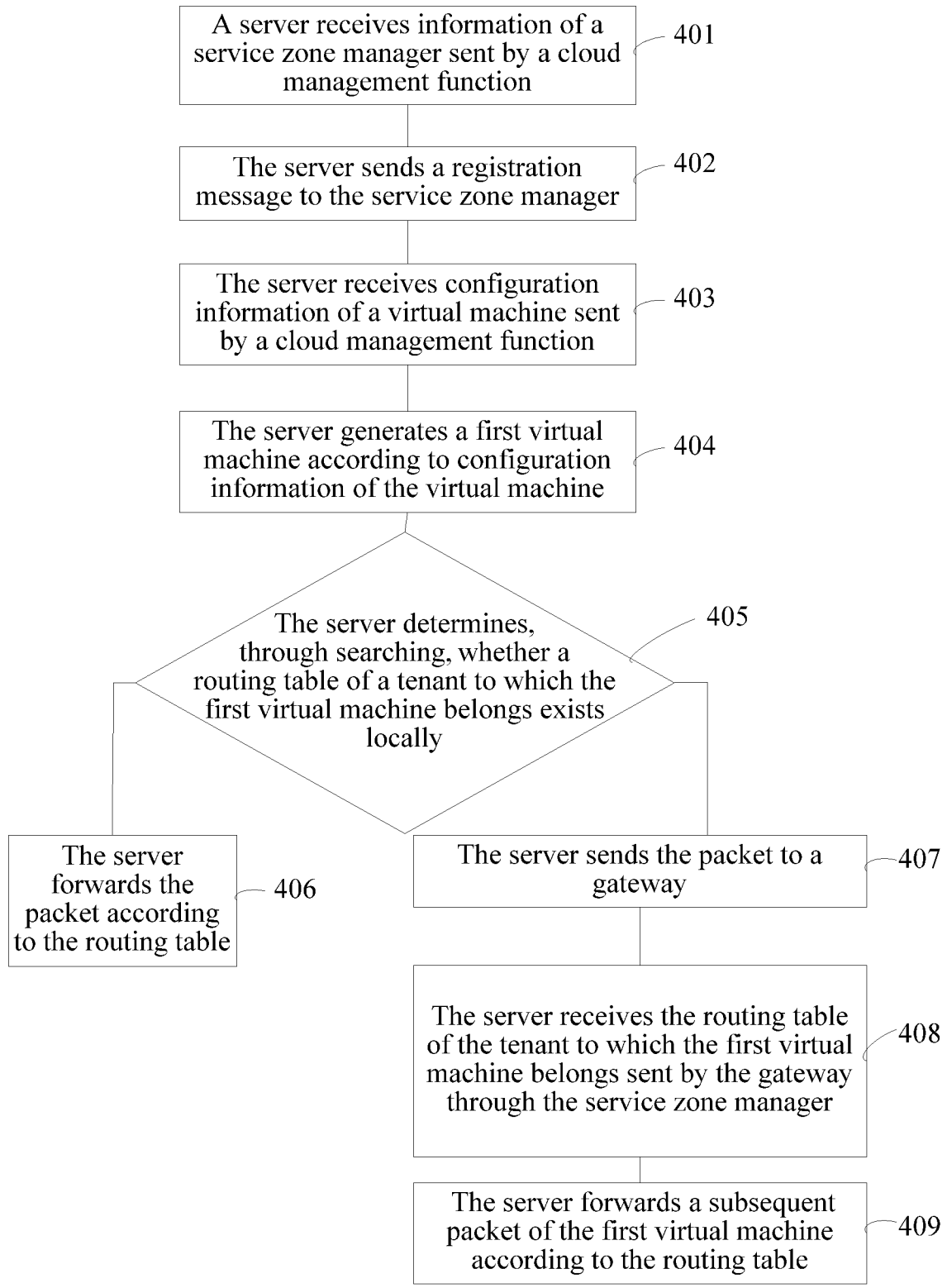
FIG. 4 is a flow chart of a method for cross-service-zone communication provided in another embodiment of the present invention.

Furthermore, on a basis of the data center network shown in FIG. 2, an embodiment of the present invention provides a method for cross-service-zone communication. The method is executed by the server in FIG. 2. As shown in FIG. 4, the method includes:

401. A server receives information of a service zone manager sent by a cloud management function.

After adding one server to a service zone managed by the cloud management function, the cloud management function sends information of the service zone manager to the server.

402. The server sends a registration message to the service zone manager, where the registration message is used to enable the service zone manager to register the server.

After receiving the information of the service zone manager sent by the cloud management function, the server sends the registration message to the service zone manager, so that the service zone manager registers the server. After registration, the service zone manager sends the routing table to the server. The registration message further includes authentication information, so that after receiving the registration message, the service zone manager first authenticates the server according to the authentication information, and registers the server when the authentication succeeds.

403. The server receives configuration information of a virtual machine sent by the cloud management function.

After creating one virtual machine in the server, the cloud management function sends configuration information of the virtual machine to the server.

404. The server generates a first virtual machine according to configuration information of the virtual machine.

After receiving the configuration information of the virtual machine, the server runs a network virtualization system and generates a corresponding virtual machine.

405. When the first virtual machine needs to send a packet to a second virtual machine, the server determines, through searching, whether a routing table of a tenant to which the first virtual machine belongs exists locally, if yes, executes step 406, and if not, executes step 407. The packet carries an address of the virtual machine and an address and a subnet identifier of the server. The subnet is a subnet allocated to the tenant to which the virtual machine belongs. Through the subnet identifier, the tenant to which the virtual machine belongs can be determined. The first virtual machine and the second virtual machine are located in different service zones.

406. The server forwards the packet according to the routing table.

The routing table of the tenant to which the virtual machine belongs exists locally on the server possibly because:

The packet is not a first packet of the tenant to which the virtual machine belongs. A gateway has already sent the routing table of the tenant to the server through the service zone manager according to a packet sent by another virtual machine of the tenant. Alternatively, after receiving the configuration information of the virtual machine, the service zone manager acquires the routing table of the tenant to which the virtual machine belongs from the gateway and sends the routing table to the server.

407. The server sends the packet to a gateway.

408. The server receives the routing table of the tenant to which the virtual machine belongs sent by the gateway through the service zone manager.

After receiving the packet, the gateway determines the tenant to which the virtual machine belongs according to the subnet identifier carried in the packet and acquires a routing table corresponding to the tenant. Alternatively, the gateway directly acquires a routing table corresponding to the subnet identifier, and sends the routing table and the information of the server to the service zone manager. The service zone manager sends the routing table to the server according to the server information.

409. The server forwards a subsequent packet of the first virtual machine according to the routing table.

When the cloud management function needs to delete the server, the cloud management function sends a notification message to the server, and the server sends a deregistration message to the service zone manager according to the notification message, where the deregistration message is used to instruct the service zone manager to delete the registration information of the server.

In addition, when the routing table of the tenant to which the virtual machine belongs is updated in a gateway, the server is further configured to receive the updated routing table of the tenant that is sent by the gateway through the service zone manager. A packet sent by the virtual machine of the tenant is forwarded according to the updated routing table.

Figure 5:
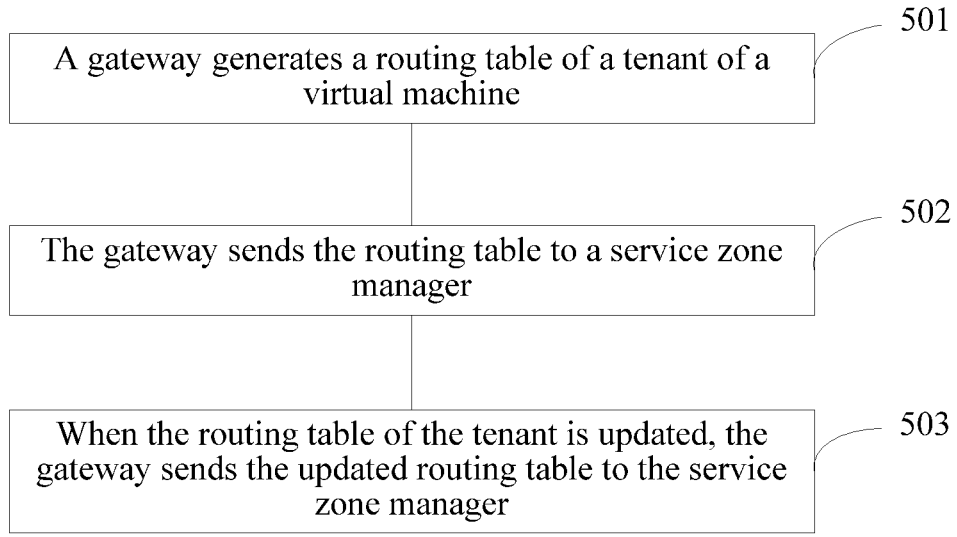
FIG. 5 is a flow chart of a method for cross-service-zone communication provided in still another embodiment of the present invention.

On a basis of the data center network shown in FIG. 2, an embodiment of the present invention provides another method for cross-service-zone communication. The method is executed by the gateway in FIG. 2. As shown in FIG. 5, the method includes:

501. A gateway generates a routing table of a tenant of a virtual machine.

This step may specifically include the following implementation manners:

The gateway receives configuration information of a virtual machine sent by a cloud management function, and generates a routing table of a tenant to which the virtual machine belongs according to the configuration information.

Alternatively, the gateway receives an ARP packet that is sent by a server according to the configuration information of the virtual machine, and generates a routing table of a tenant to which the virtual machine belongs according to the ARP packet.

502. The gateway sends the routing table to a service zone manager.

In an implementation scenario, the gateway receives a packet that is sent by a first virtual machine in the server to a second virtual machine. The packet carries an address of the first virtual machine, and an address and a subnet identifier of the server of the first virtual machine. The gateway acquires the routing table of the tenant to which the virtual machine belongs according to the subnet identifier. The routing table and the information of the server where the virtual machine is located are sent to the service zone manager. In the scenario, the gateway further needs to forward the packet to the second virtual machine according to the routing table. The first virtual machine and the second virtual machine are located in different service zones.

In another implementation scenario, the gateway receives a request message sent by the service zone manager, where the request message is used to request the routing table of the tenant to which the virtual machine belongs, and the gateway sends the routing table to the service zone manager according to the request message.

503. When the routing table of the tenant is updated, the gateway sends the updated routing table to the service zone manager.

In the foregoing method of the embodiment of the present invention, a routing table generated on a gateway is sent to a server, the server can directly forward, according to information of the routing table, a packet sent by a virtual machine on the server, with no need to send the packet to the gateway, which solves problems of traffic congestion and low system forwarding performance caused by cross-service-zone communication through a gateway in the prior art.

Figure 6:
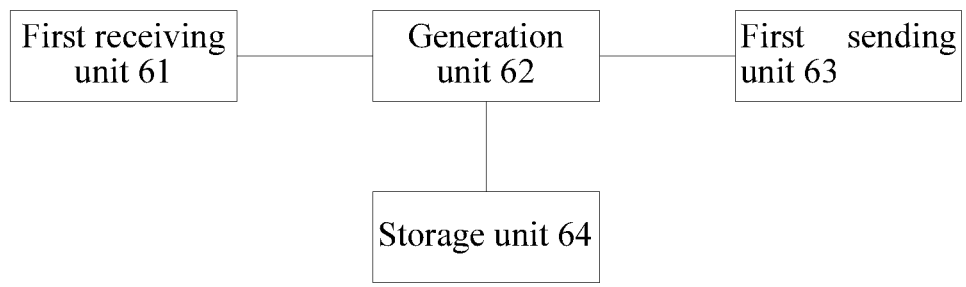
FIG. 6 is a schematic structural diagram of a gateway provided in an embodiment of the present invention.

In an implementation manner, as shown in FIG. 6, the gateway 2 includes a first receiving unit 61 configured to receive configuration information of a virtual machine sent by a cloud management function; a generation unit 62 configured to generate a routing table of a tenant to which the virtual machine belongs according to the configuration information; a storage unit 64 configured to store the routing table; and a first sending unit 63 configured to send the routing table to a service zone manager.

In another embodiment, the first receiving unit 61 is configured to receive an ARP packet sent by the server according to the configuration information of the virtual machine. The generation unit 62 is configured to generate a routing table of a tenant to which the virtual machine belongs according to the ARP packet.

In an embodiment (not shown in the figure), the gateway 2 further includes a second receiving unit 65 configured to receive a packet sent by a first virtual machine to a second virtual machine. The packet carries an address of the first virtual machine, and an address and a subnet identifier of the server of the first virtual machine. A first acquiring unit 66 is configured to acquire a routing table of a tenant to which the first virtual machine belongs from the storage unit according to the subnet identifier. The first sending unit 63 is specifically configured to send the routing table to the service zone manager. The gateway further includes a second sending unit 67, which is configured to forward the packet to the second virtual machine according to the routing table. The first virtual machine and the second virtual machine are located in different service zones.

In another embodiment (not shown in the figure), the gateway 2 further includes a third receiving unit 68, further configured to receive a request message sent by the service zone manager, where the request message is used for requesting a routing table of a tenant to which the virtual machine belongs; and a second acquiring unit 69 configured to acquire the routing table of the tenant to which the virtual machine belongs from the storage unit according to the request message. The first sending unit 63 is further configured to send the routing table to the service zone manager according to the request message.

Optionally, the first sending unit 63 is further configured to, when the routing table of the tenant is updated, send the updated routing table to the service zone manager.

Figure 7:
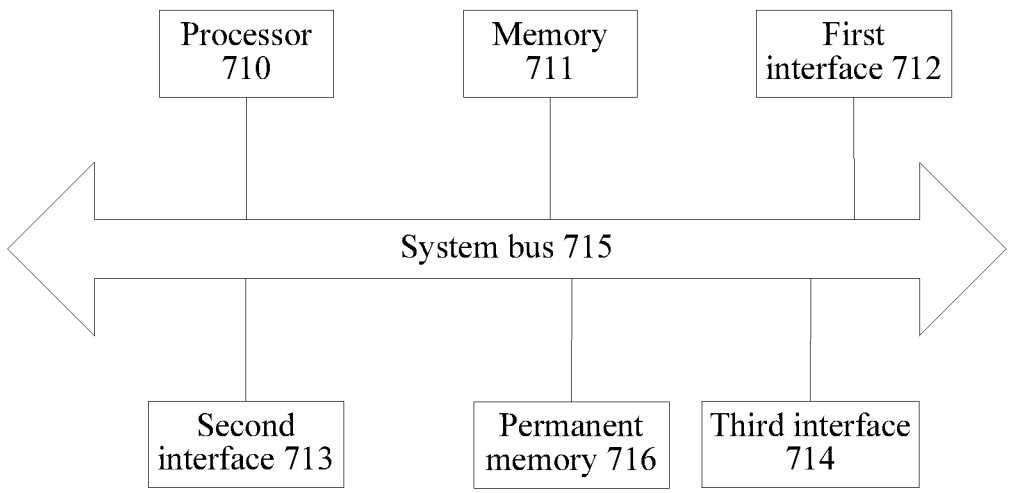
FIG. 7 is a schematic structural diagram of a gateway provided in another embodiment of the present invention.

In another implementation manner, referring to FIG. 7, the gateway 2 includes a processor 710, a memory 711, a first interface 712 configured to communicate with a cloud management function 1, a second interface 713 configured to communicate with a service zone manager, a third interface 714 configured to communicate with a server, and a system bus 715 interconnecting these components. The gateway further includes a software module and a device driver program stored in a permanent memory 716 (for example, a hard disk driver and a flash memory). Upon starting, these software components are loaded into the memory 711 and are then accessed and executed by the processor 710 to implement the functions of the gateway.

In another implementation manner, the service zone manager is disposed inside the gateway and serves as a functional module of the gateway, and in this case the second interface 713 that communications with the service zone manager is an internal interface of the gateway.

Figure 8:
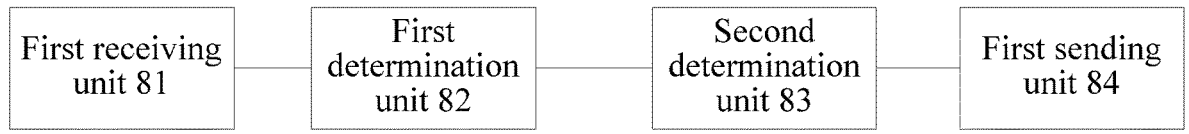
FIG. 8 is a schematic structural diagram of a service zone manager provided in an embodiment of the present invention.

In an implementation manner, as shown in FIG. 8, the service zone manager 3 includes a first receiving unit 81 configured to receive a routing table of a tenant, to which a first virtual machine belongs, sent by a gateway, where the first virtual machine is located in a first service zone; a first determination unit 82 configured to determine a server to receive the routing table; a second determination unit 83 configured to determine a registration state of the server; and a first sending unit 84 configured to, when the second determination unit determines that the server is already registered, send the routing table to the server, so that the server forwards, according to the routing table, a packet that is sent to a second virtual machine by the first virtual machine, where the second virtual machine is located in a second service zone.

In another embodiment (not shown in the figure), the service zone manager 3 further includes a second receiving unit 85 configured to receive configuration information of the first virtual machine sent by a cloud management function; and a second sending unit 86 configured to send a request message to the gateway according to the configuration information, where the request message is used for requesting a routing table of a tenant to which the virtual machine belongs. The first receiving unit 81 is specifically configured to receive the routing table sent by the gateway according to the request message.

In another embodiment (not shown in the figure), the service zone manager 3 further includes a registration unit 87 configured to receive a registration message sent by the server, register the server, and record registration information of the server; and a storage unit 88 configured to store the registration information. The second determination unit 83 is specifically configured to determine a registration state of the server according to the registration information of the server in the storage unit 88.

In another embodiment (not shown in the figure), the service zone manager 3 further includes a deregistration unit 89 configured to receive a deregistration message sent by the server, and deletes the registration information of the server in the storage unit 88 according to the deregistration message.

In another embodiment, the first receiving unit 81 is further configured to receive an updated routing table of the tenant sent by the gateway, and the first sending unit 84 is further configured to send the updated routing table of the tenant to the server.

Figure 9:
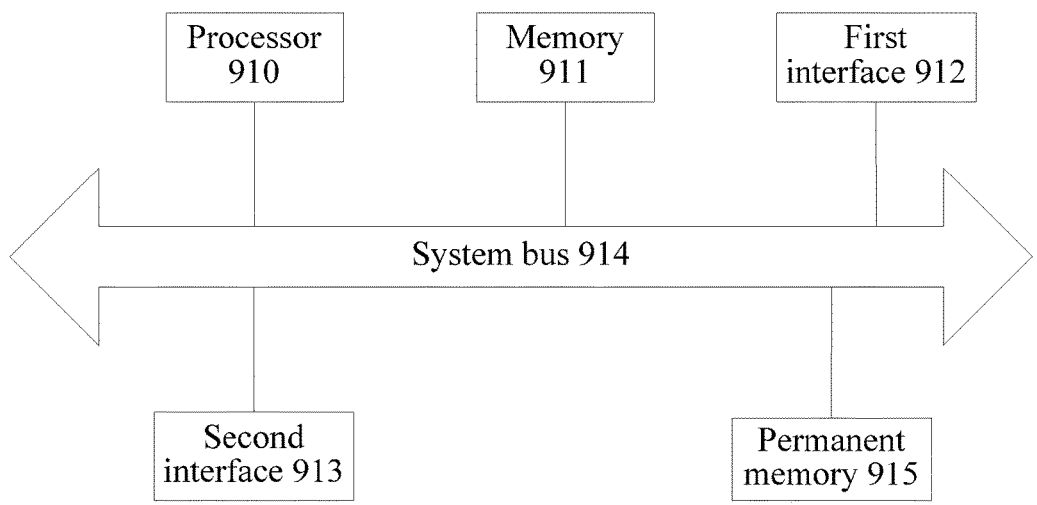
FIG. 9 is a schematic structural diagram of a service zone manager provided in another embodiment of the present invention.

In another implementation manner, referring to FIG. 9, the service zone manager includes a processor 910, a memory 911, a first interface 912 configured to communicate with a gateway 2, a second interface 913 configured to communicate with a server, and a system bus 914 interconnecting these components. The service zone manager further includes a software module and a device driver program stored in a permanent memory 915 (for example, a hard disk driver and a flash memory). Upon starting these software components are loaded into the memory 911 and then are accessed and executed by the processor 910 to implement the functions of the service zone manager.

In an embodiment, as shown in FIG. 2, the server 2 includes a virtual switch configured to, when a first virtual machine on a server needs to send a packet to a second virtual machine, determine, through searching, whether a routing table of a tenant to which the first virtual machine belongs exists locally; and when the routing table of the tenant to which the first virtual machine belongs does not exist locally, send the packet to a gateway; and a service zone agent configured to receive the routing table of the tenant to which the first virtual machine belongs sent by the gateway through a service zone manager, and send the routing table to the virtual switch; where the virtual switch is further configured to forward a subsequent packet of the first virtual machine according to the routing table; and the first virtual machine and the second virtual machine are located in different service zones.

In another embodiment, the virtual switch is located in a network virtualization system, and the network virtualization system is further configured to receive configuration information of the first virtual machine sent by a cloud management function, and generate the first virtual machine according to the configuration information.

In another embodiment, the network virtualization system is further configured to receive information of the service zone manager sent by a cloud management function, the service zone agent is further configured to send a registration message to the service zone manager, so that the service zone manager records registration information of the server. Further, the network virtualization system is further configured to receive a notification message sent by the cloud management function, and the service zone agent is further configured to send a deregistration message to the service zone manager according to the notification message, so that the service zone manager deletes the registration information of the server.

Optionally, when the routing table of the tenant to which the first virtual machine belongs is updated in the gateway, the service zone agent is further configured to receive the updated routing table of the tenant that is sent by the gateway through the service zone manager, and send the updated routing table to the virtual switch. The virtual switch is further configured to forward a subsequent packet of the first virtual machine according to the updated routing table.

Figure 10:
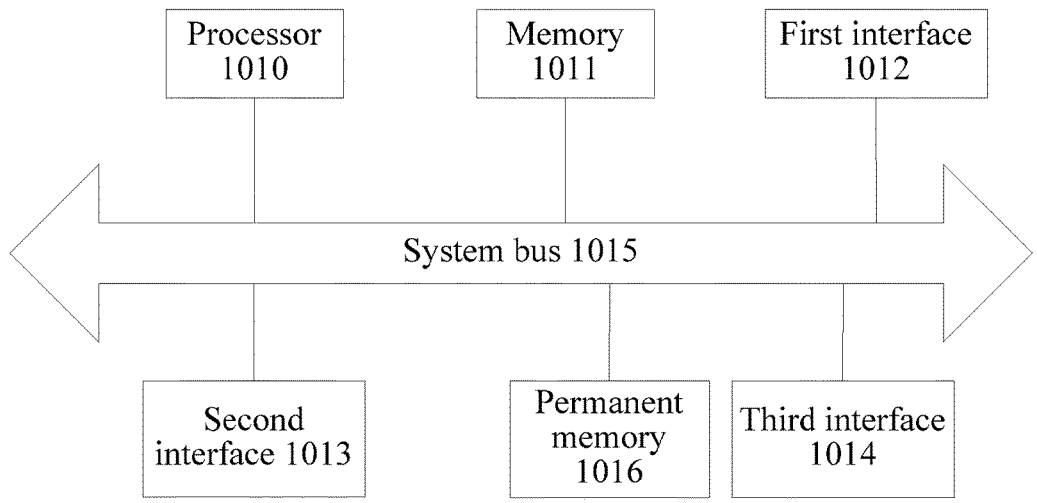
FIG. 10 is a schematic structural diagram of a server provided in an embodiment of the present invention.

In another embodiment, as shown in FIG. 10, the server 2 includes a processor 1010, a memory 1011, a first interface 1012 configured to communicate with a cloud management function 1, a second interface 1013 configured to communicate with a service zone manager, a third interface 1014 configured to communicate with a gateway, and a system bus 1015 interconnecting these components. The gateway further includes a software module and a device driver program stored in a permanent memory 1016 (for example, a hard disk driver and a flash memory). Upon starting these software components are loaded into the memory 1011, and are then accessed and executed by the processor 1010 to implement the functions of the server.

In the foregoing embodiments of the present invention, a routing table generated on a gateway is sent to a server, the server can directly forward, according to information of the routing table, a packet sent by a virtual machine on the server, with no need to send the packet to the gateway, which solves problems of traffic congestion and low system forwarding performance caused by cross-service-zone communication through a gateway in the prior art.

A person of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program code, such as a read only memory (ROM), a random access memory (RAM), a magnetic disk, or an optical disc.

The foregoing description is merely exemplary embodiments of the present invention, but is not intended to limit the present invention. Any modification, equivalent replacement, or improvement made within the principle of the present invention shall fall within the protection scope of the present invention.

What is claimed is:

1. A method for cross-service-zone communication performed by a service zone manager in a system, wherein the system comprises the service zone manager, a gateway, a first service zone, and a second service zone, wherein the service zone manager manages the first service zone and the second service zone, wherein each of the first service zone and the second service zone comprises a plurality of servers, wherein each server comprises at least one virtual machine, wherein virtual machines on a same server belong to a same service zone, and wherein the method comprises:

receiving, by the service zone manager, a routing table of a tenant from the gateway for the first service zone, wherein the first service zone comprises a first server that comprises a first virtual machine;

determining, by the service zone manager, a server to receive the routing table, wherein the server to receive the routing table comprises at least one of the first server or a second server, wherein the second server is in the second service zone and comprises a second virtual machine, and wherein the first virtual machine and the second virtual machine both belong to the tenant;

determining, by the service zone manager, a registration state of the server to receive the routing table; and sending, by the service zone manager, the routing table to the server to receive the routing table when the server to receive the routing table is a registered server such that the server to receive the routing table forwards packets between the first virtual machine and the second virtual machine without traversing the gateway.

2. The method of claim 1, wherein before receiving, by the service zone manager, the routing table of the tenant, the method further comprises:

receiving, by the service zone manager, configuration information for the first virtual machine from a cloud management function; and sending, by the service zone manager, a request message to the gateway according to the configuration information, wherein the request message is used for requesting the routing table.

3. The method of claim 1, further comprising:

receiving, by the service zone manager, a registration message from the server to receive the routing table;

registering, by the service zone manager, the server to receive the routing table according to the registration message; and recording, by the service zone manager, registration information of the server to receive the routing table, wherein the registration state of the server to receive the routing table is determined by determining the registration state of the server to receive the routing table according to the registration information of the server to receive the routing table.

4. The method of claim 3, further comprising:

receiving, by the service zone manager, a deregistration message from the server to receive the routing table; and deleting, by the service zone manager, the registration information of the server to receive the routing table according to the deregistration message.

5. The method of claim 1, further comprising:

receiving, by the service zone manager, an updated routing table of the tenant from the gateway; and sending, by the service zone manager, the updated routing table to the server to receive the routing table.

6. A method for cross-service-zone communication performed by a first server in a first service zone of a system, wherein the system comprises a service zone manager, a gateway, the first service zone, and a second service zone, wherein the service zone manager manages the first service zone and the second service zone, wherein each of the first service zone and the second service zone comprises a plurality of servers, wherein each server comprises at least one virtual machine, wherein virtual machines on a same server belong to a same service zone, wherein the first server comprises a first virtual machine, and wherein the method comprises:

determining whether a routing table of a tenant exists on the first server when the first virtual machine needs to send a first packet to a second virtual machine, wherein the second virtual machine is on a second server in the second service zone, and wherein the first virtual machine and the second virtual machine both belong to the tenant;

sending the first packet to the gateway associated with the first server when the routing table of the tenant does not exist on the first server;

receiving the routing table of the tenant from the service zone manager; and sending a second packet of the first virtual machine to the second virtual machine according to the routing table without traversing the gateway.

7. The method of claim 6, further comprising:
receiving configuration information for the first virtual machine from a cloud management function; and
generating the first virtual machine according to the configuration information.

8. The method of claim 6, further comprising:
receiving information of the service zone manager from a cloud management function; and
sending a registration message to the service zone manager.

9. The method of claim 8, further comprising:
receiving a notification message from the cloud management function; and
sending a deregistration message to the service zone manager according to the notification message.

10. The method of claim 6, further comprising:
receiving an updated routing table of the tenant from the service zone manager when the routing table of the tenant is updated in the gateway; and
sending a third packet of the first virtual machine to the second virtual machine according to the updated routing table.

11. A service zone manager in a system for cross-service-zone communication, wherein the system comprises the service zone manager, a gateway, a first service zone, and a second service zone, wherein the service zone manager manages the first service zone and the second service zone, wherein each of the first service zone and the second service zone comprises a plurality of servers, wherein each server comprises at least one virtual machine, wherein virtual machines on a same server belong to a same service zone, and wherein the service zone manager comprises:

a memory configured to store instructions; and
a processor coupled to the memory and configured to execute the instructions to:
receive, by the service zone manager, a routing table of a tenant from the gateway for a first service zone, wherein the first service zone comprises a first server that comprises a first virtual machine;
determine, by the service zone manager, a server to receive the routing table, wherein the server to receive the routing table comprises at least one of the first server or a second server, wherein the second server is in the second service zone and comprises a second virtual machine, and wherein the first virtual machine and the second virtual machine both belong to the tenant;
determine, by the service zone manager, a registration state of the server to receive the routing table; and
send, by the service zone manager, the routing table to the server to receive the routing table when the server to receive the routing table is already registered such that the server to receive the routing table forwards packets between the first virtual machine and the second virtual machine without traversing the gateway.

12. The service zone manager of claim 11, wherein the processor is further configured to execute the instructions to:
receive, by the service zone manager, configuration information for the first virtual machine from a cloud management function; and
send, by the service zone manager, a request message to the gateway according to the configuration information, wherein the request message is used for requesting the routing table.

13. The service zone manager of claim 11, wherein the processor is further configured to execute the instructions to:
receive, by the service zone manager, a registration message from the server to receive the routing table;
register, by the service zone manager, the server to receive the routing table; and
record, by the service zone manager, registration information of the server to receive the routing table, wherein the registration state of the server to receive the routing table is determined by determining the registration state of the server to receive the routing table according to the registration information.

14. The service zone manager of claim 13, wherein the processor is further configured to execute the instructions to:
receive, by the service zone manager, a deregistration message from the server to receive the routing table; and
delete, by the service zone manager, the registration information of the server to receive the routing table according to the deregistration message.

15. The service zone manager of claim 11, wherein the processor is further configured to execute the instructions to:
receive, by the service zone manager, an updated routing table of the tenant from the gateway; and
send, by the service zone manager, the updated routing table of the tenant to the server to receive the routing table.

16. An apparatus for cross-service-zone communication, wherein the apparatus is a first server in a first service zone of a system, wherein the system comprises a service zone manager, a gateway, the first service zone, and a second service zone, wherein the service zone manager manages the first service zone and the second service zone, wherein each of the first service zone and the second service zone comprises a plurality of servers, wherein each server comprises at least one virtual machine, wherein virtual machines on a same server belong to a same service zone, and wherein the first server comprises:

a memory configured to store instructions; and
at least one processor coupled to the memory and configured to execute the instructions to:
determine whether a routing table of a tenant exists on the first server when a first virtual machine on the first server needs to send a first packet to a second virtual machine, wherein the second virtual machine is on a second server in the second service zone, and wherein the first virtual machine and the second virtual machine both belong to the tenant;
send the first packet to the gateway associated with the first server when a routing table of the tenant does not exist on the first server;
receive the routing table of the tenant from the service zone manager; and send a second packet of the first virtual machine to the second virtual machine according to the routing table without traversing the gateway.

17. The apparatus of claim 16, wherein the at least one processor is further configured to execute the instructions to:
receive configuration information for the first virtual machine from a cloud management function; and
generate the first virtual machine according to the configuration information.

18. The apparatus of claim 16, wherein the at least one processor is further configured to execute the instructions to:
receive information of the service zone manager from a cloud management function; and
send a registration message to the service zone manager.

19. The apparatus of claim 18, wherein the at least one processor is further configured to execute the instructions to:
receive a notification message from the cloud management function; and
send a deregistration message to the service zone manager according to the notification message.

20. The apparatus of claim 16, wherein when the routing table of the tenant is updated in the gateway, the at least one processor is further configured to execute the instructions to:
receive an updated routing table of the tenant from the service zone manager; and
send a third packet of the first virtual machine according to the updated routing table.

* * * * *